M. T. RHEA.
DINNER PAIL.
APPLICATION FILED JUNE 13, 1907.
905,581.
Patented Dec. 1, 1908.
2 SHEETS—SHEET 1.
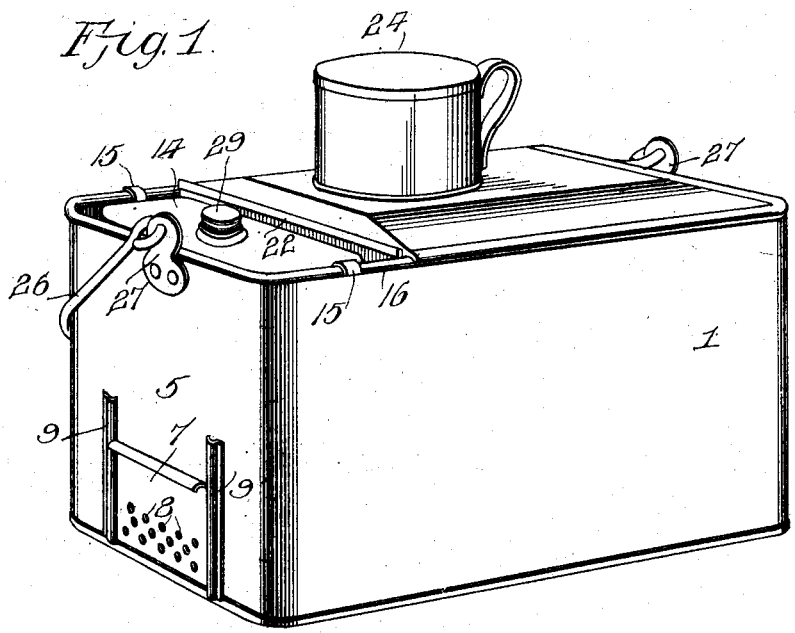
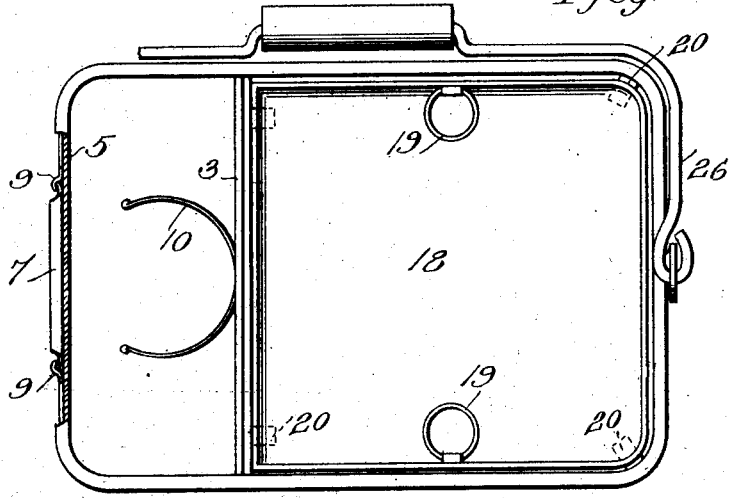
Witnesses
Frank Hough
Inventor
Melvin T. Rhea,
By Victor J. Evans
Attorney

M. T. RHEA.
DINNER PAIL.
APPLICATION FILED JUNE 13, 1907.

905,581.

Patented Dec. 1, 1908.

2 SHEETS—SHEET 2.

Witnesses

Inventor
Melvin T. Rhea,
By Victor J. Evans
Attorney

UNITED STATES PATENT OFFICE.

MELVIN T. RHEA, OF EMLENTON, PENNSYLVANIA, ASSIGNOR OF ONE-HALF TO HENRY C. HEETER, OF CALLENSBURG, PENNSYLVANIA.

DINNER-PAIL.

No. 905,581.　　　　Specification of Letters Patent.　　　　Patented Dec. 1, 1908.

Application filed June 13, 1907. Serial No. 378,819.

*To all whom it may concern:*

Be it known that I, MELVIN T. RHEA, a citizen of the United States of America, residing at Emlenton, in the county of Venango and State of Pennsylvania, have invented new and useful Improvements in Dinner-Pails, of which the following is a specification.

This invention relates to dinner pails, and one of the principal objects of the same is to provide simple and convenient means for heating the coffee or tea in a metal can or receptacle provided for this purpose.

Another object of the invention is to provide a small spirit lamp, and a clasp for holding the same in position underneath a can or receptacle supported in the dinner pail above the lamp so that coffee, tea or other liquid may be heated.

Figure 3:
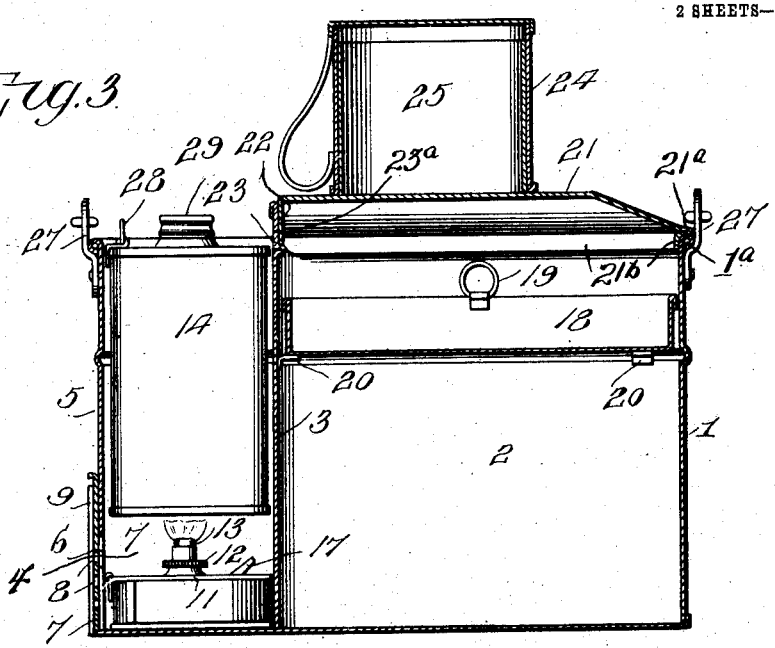
Figure 4:
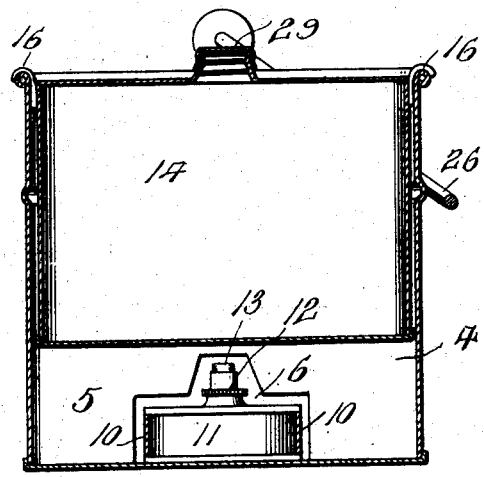

These and other objects may be attained by means of the construction illustrated in the accompanying drawing, in which:

Figure 1 is a perspective view of a dinner pail made in accordance with my invention. Fig. 2 is a top plan view and partial section of a dinner pail made in accordance with my invention with the cover removed, and the coffee can and lamp removed. Fig. 3 is a vertical longitudinal section of the same. Fig. 4 is a vertical transverse section of the same.

Referring to the drawings for a more particular description of my invention, the numeral 1 designates the rectangular body portion of the dinner pail provided with a rectangular compartment 2 and a partition 3 which divides said compartment from the rectangular heating chamber 4. The wall 5 of the heating chamber is provided with a recess 6 cut therefrom, and a sliding door 7 provided with air holes 8 closes the recess or opening 6, the edges of said door 7 being fitted in metal guide strips 9 so that it can be freely raised and lowered. Secured to the partition 3 is a U-shaped spring clasp 10 and a spirit lamp 11 provided with a suitable burner 12 and a wick 13 of a size and shape adapted to be passed through the recess or opening 6 in the wall 5, is held in position by the spring clasp 10. A metal can 14 for holding tea, coffee, or other liquid to be heated, fits within the heating chamber 4, and is provided with supporting ears 15 which engage the beaded upper edge 16 of the body portion of the dinner pail. The lamp 11 is provided with a vent tube 17. Within the body portion of the dinner pail a tray 18 provided with lifting rings 19, is seated upon supporting lugs 20 secured to the inner wall of the body portion of the dinner pail.

The cover 21 is provided for closing the top of the compartment 2. This cover is rectangular in form to correspond to the shape of said compartment, and is provided at its outer end and at its sides with a horizontal lip or shoulder 21$^a$ to rest upon the top surface of the bead 1$^a$ and with a depending flange 21$^b$ to bear against the inner face of said bead and the adjacent portion of the wall of the compartment, whereby a tight closure is secured. The inner end of the cover is formed with a downwardly projecting plate flange or wall 22 terminating above the plane of the lower edge of the flange 21$^b$ and adapted to rest against a bead or shoulder 23 formed upon the partition 3 below the top of the vessel. The partition has an extension 23$^a$ projecting upwardly beyond the plane of the top of the vessel and forming a support against which the flange 22 bears, by which the cover is firmly and securely held in position. This extension obviates the necessity of the formation of a rolled bead or rim upon the upper edge of the partition, as well as the necessity of making the lip 21$^a$ and flange 21$^b$ continuous around the cover, thus simplifying the construction and providing for the better retention of the cover in position. By dispensing with the use of a rolled bead upon the edge of the partition, which would project in practice into the chamber 4, the necessity of increasing the width of said chamber 4 to enable the cam 14 to clear the bead as it is inserted and removed is avoided.

A removable cup 24 is fitted to a cylindrical flange 25 secured to the top of the cover, and a suitable handle or bail 26 is pivotally connected to ears 27 secured to the body portion of the dinner pail.

When it is desired to heat the liquid in the receptacle 14, the lamp 11 is withdrawn through the opening 6 and lighted, and reinserted in the opening and the door 7 is closed. The receptacle 14 may be readily withdrawn by means of a ring 28 secured to the upper end thereof. A screw cap 29 is fitted to the upper end of the receptacle 14.

From the foregoing it will be obvious that a dinner pail made in accordance with my invention is of simple construction, is provided with a heating chamber and a spirit lamp by means of which coffee, tea, or other liquid may be readily heated, and is very convenient and efficient in use, and can be produced at slight cost.

Having thus described the invention, what I claim is:

A pail of the character described, comprising a rectangular body or receptacle having a continuous beaded rim, a vertical transverse partition separating said receptacle into rectangular compartments, said partition being provided with a shoulder on its side facing one of the compartments and located below the plane of the rim, and having an extension projecting upward from said shoulder above the plane of the rim, and a cover for the first named compartment provided at its sides and outer end with a horizontal lip or shoulder to rest upon the corresponding portions of the beaded edge and a coöperating vertical flange to fit down into the compartment and bear against the inner surfaces of the side and outer end walls thereof, and having at its inner end a depending vertical flange extending downward from the top of the cover and terminating above the plane of the first-named flange, said inner end flange being adapted to bear against the partition extension and rest at its lower edge upon said shoulder at the base thereof.

In testimony whereof, I affix my signature in presence of two witnesses.

MELVIN T. RHEA.

Witnesses:
HENRY TIPPERY,
GRANVILLE B. POLLOCK.